A. B. CRAWFORD.
Thrashing Machine.
No. 29,865.
2 Sheets—Sheet 1.
Patented Sept. 4, 1860.
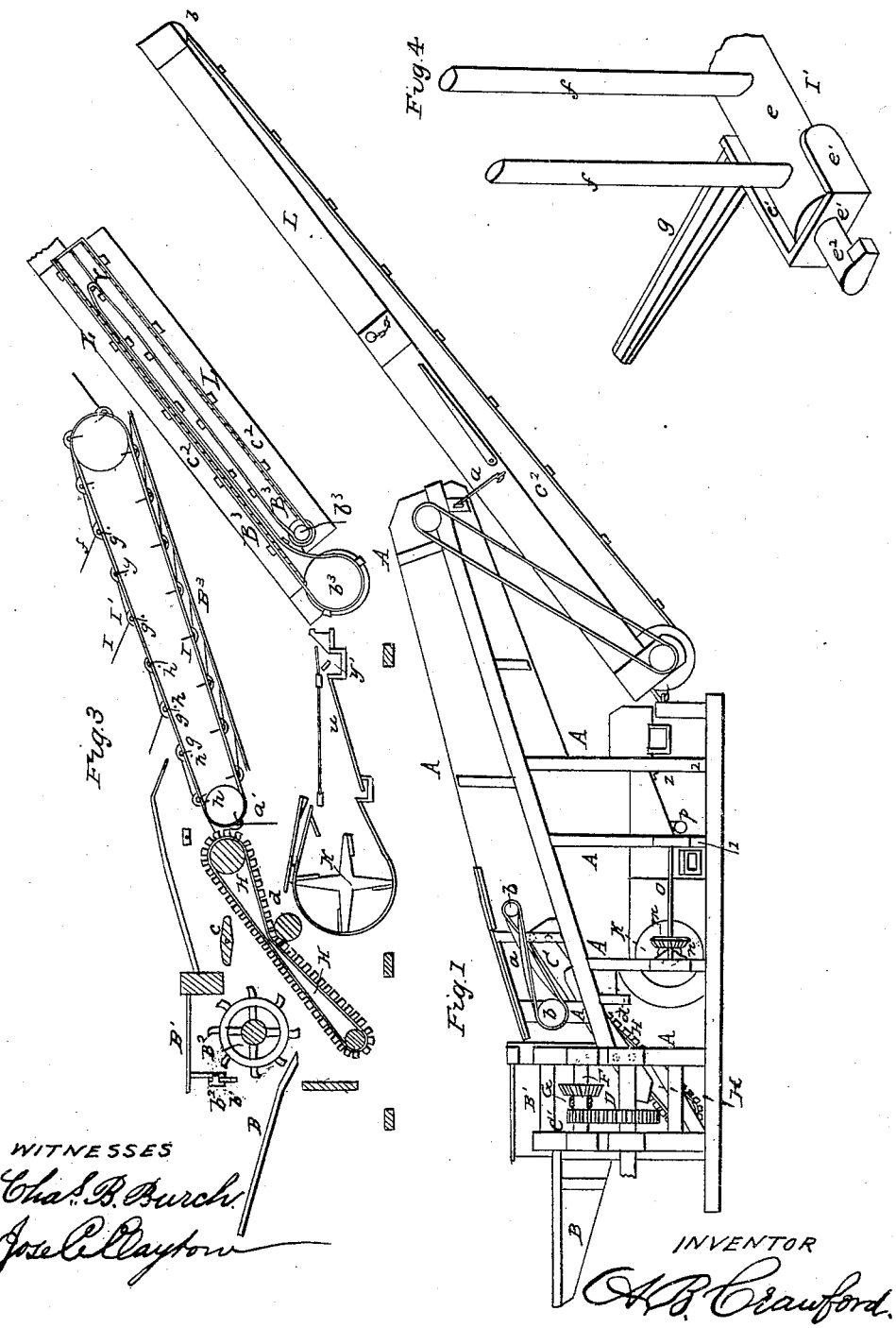
WITNESSES
Chas. B. Burch
Jose C. Clayton
INVENTOR
A. B. Crawford A. B. CRAWFORD.
Thrashing Machine.
No. 29,865.
2 Sheets—Sheet 2.
Patented Sept. 4, 1860.
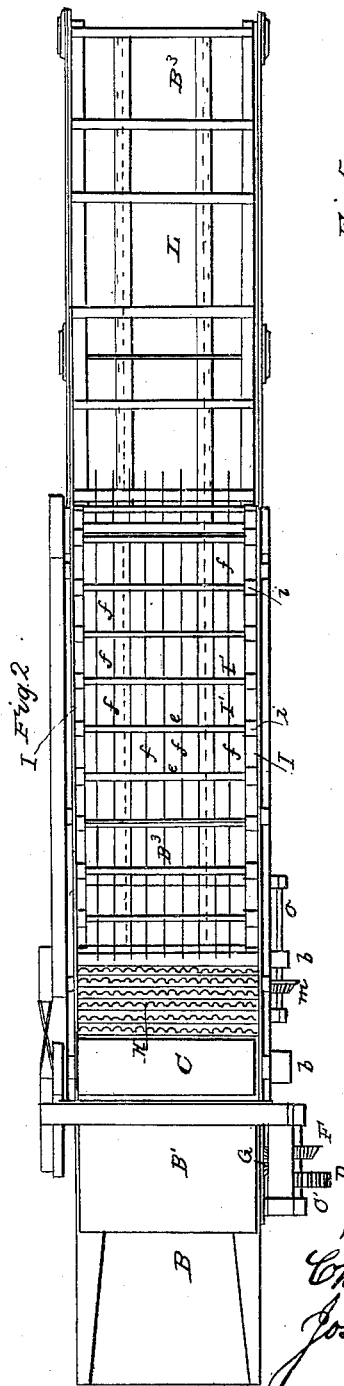
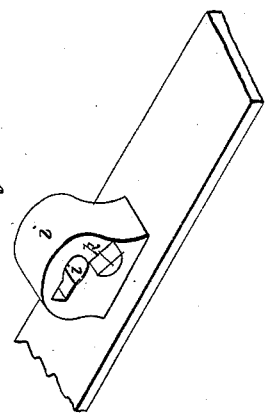
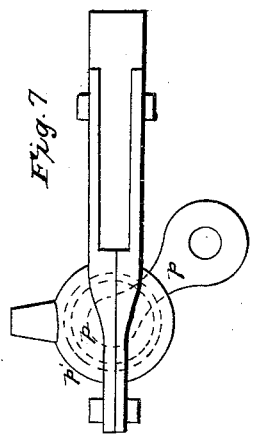
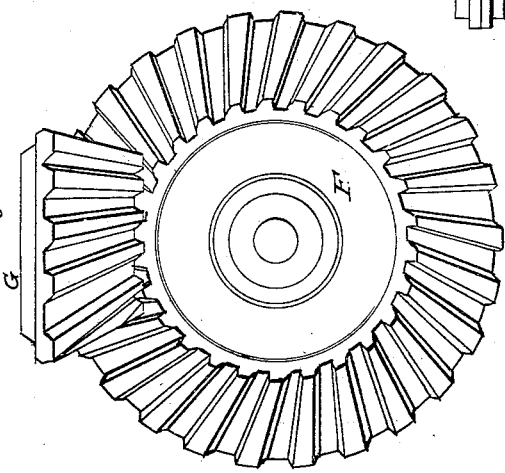
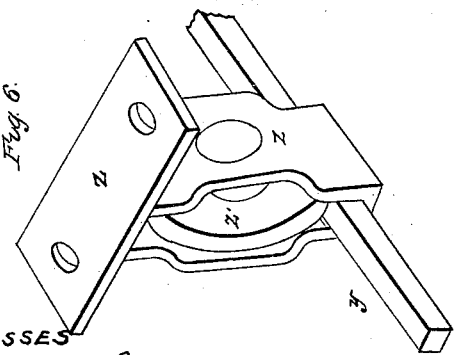
WITNESSES
Chas. B. Burch.
Jos. C. Clayton.
INVENTOR
A. B. Crawford.

UNITED STATES PATENT OFFICE.

A. B. CRAWFORD, OF PIQUA, OHIO.

THRESHING-MACHINE.

Specification forming part of Letters Patent No. 29,865, dated September 4, 1860; Reissued May 31, 1870, No. 4,007.

*To all whom it may concern:*

Be it known that I, A. B. CRAWFORD, of Piqua, Miami county, and State of Ohio, have invented new and useful Improvements in Grain Threshing and Separating Machines; and I do hereby declare that the following is a full, clear, and exact description thereof, reference being had to the accompanying drawings and to the letters of reference marked thereon.

Figure 1, is a side elevation. Fig. 2, is a longitudinal section through the line of $x$—$x$ of Fig. 1. Fig. 3, is a plan view. Fig. 4, is a view of arm $e$, fingers $f$, tooth $g$, and casting $E'$. Fig 5, a view of thimble $i$. Fig. 6, view of caster. Fig. 7, view of ball and socket joint.

To enable others skilled in the art to make and use my invention, I will describe its construction and operation.

In Fig. 1, A, is the frame of the machine; B, the hopper or throat through which the grain is fed to the cylinder; $b'$, the adjustable throat for regulating the opening through which the grain is fed to the machine. This is done by turning the two screws $b^2$, by which it is fastened to the cap, when the board can be raised or lowered as desired and then fastened by the screws.

B' is the cylinder cap; $B^2$ Fig. 3, the cylinder; C the adjustable elastic sides composed of sides made of boards that can be slipped into the grooves in the sides of the frame, and may be allowed to move laterally by not being made to fit tightly in the grooves, and against these sides which have a plain or smooth surface on the insides of them the bolt H, operates, and in this sense they are adjustable elastic sides.

$a$ is band on pulleys $b$, for operating picker $c$; D, the driving wheel; C', spur wheel; F, bevel cog wheel, fitting into pinion G; H, the cellular, or honey comb belt, for carrying the grain and straw from the cylinder $B^2$ in Figs. 2 and 3. This belt is formed of canvas, or any belting material as a bottom and plays around pulleys like any ordinary endless belt. The cross strips containing the cells, are formed by taking strips of boards of about one and one-half inches thick, by three inches wide. I then with a two inch bit, bore holes in these pieces, nearly through, leaving only about one eighth of an inch standing. I then rip these boards lengthwise through the center, thus dividing them in two pieces. One of these pieces has its ends reversed, which brings its straight side next the cells of the other piece and they are attached to the canvas with glue or in any convenient way, about one half inch apart, thus leaving a space between them so that it will not fill up or mash the grain and which allows the belt to return over the pulley $d$, Fig. 3.

I is the vibrating belt, for carrying off the straw. This belt is formed of any material out of which endless belts are made, for passing around the pulleys. It may be leather; india rubber, a flat chain, and it has vibrating sections I', extending across it, made of arms $e$ into which arms are fingers $f$ for conveying away the straw; at right angles with these fingers $f$, in each section is a descending tooth $g$, reaching down into the inside of the belt. As the belt moves forward this tooth passes over pins $h$, which gives a lifting motion upward to the fingers $f$ causing the arm to partially revolve, thus lifting up the straw as it is carried forward and shaking it, so that all the grain in it will fall out of it. As soon as the tooth $g$, passes pin $h$, the fingers $f$, by their own gravity, and weight of the straw, and spring of the belt, fall down, forming a level plane. Thus all the way up, each section of the belt is caused to vibrate, as described, thus separating completely the grain from the straw, as it passes out of the stacker, and is carried on to the stack.

It will be seen that the thimbles $i$ riveted to the belt through which the ends of arms $e$ pass, are malleable castings, and cast with points on them, which serve as rivets to fasten them to the belt. They have a hole in the center, and a slot extending out some distance to one side. They have also, a projection $k$, cast on them, (Fig. 5,) which serves as a catcher of projection $e^2$. On the ends of arm $e$, there is a malleable casting $e'$, with a journal on it which has a projection $e^2$ extending out from it to one side. When the journal is slipped into the thimble $i$ it is turned around until the projection enters the slot $i'$ in the thimble when it is pushed in through the hole until the projection passes through it. It is then turned around, and when thus received, it cannot work out of the thimble $i$, as the fingers of one section, rest on the upper side of the arm, and will not let it revolve far enough to bring the key around to the eye, to allow it to slip out and because of the projection $k$, on thimble $i$, the arm $e$, and fingers $f$, can only revolve in the other direction so far as to bring the key $e^2$, to strike against projection $k$, thus preventing it from turning so far as to let the straw fall through, or to catch reversely on its return, yet opening sufficiently to allow any straw within the belt to fall out, on leaving the grain board as seen at $d'$, Fig. 3, where it has fallen down leaving room for the straw to fall out.

K, Fig. 3, is the fan; $m$, the bevel gear wheel; $n$, the bevel pinion wheel, for operating the fan; $o$, the shaft of the wheel $m$, on the end of which is a crank and ball $h$ which is set in a socket $p$, (Fig. 7), attached to shoe $q$, and which operates said shoe. This shoe may be set on four roller casters, which rollers may be set on two rods $y$, (Fig. 6,) which extend across the machine at the posts 1, 2. These rods pass through the casters 3, directly below the rollers $z'$ and allow the shoe to move perfectly smooth, and only from side to side, but never giving to it, an oscillating or rocking motion, as the shoe may rest alone on the caster and these casters may set on the rods $y$, which pass through them.

In Fig. 3, is shown a revolving board $y'$ or governor for regulating the blast of the fan. It is placed directly in front of the riddle and immediately over the tail spout. This board can be revolved so as to close or enlarge the blast opening and thus regulate the amount of blast passing between the grain board $u$ and the riddle. L is the straw stacker; $b^3$, the pulleys on which belt $c^2$ runs, and which drive the said endless belt. This stacker is so constructed, that it can be folded up for convenience of handling and in order to do so the lower side of the belt must be held up, for if the frame is doubled the belt will fall down and be deranged. To prevent this, I use a fastening as seen at V, (or its equivalent) which is a spring pin passing through the side of the frame, and catching the belt between it and the bottom, thus holding it up so that it can be doubled up with the frame, and when the stacker is being used, the belt is relieved, and allowed to run loosely, as usual in belting.

In Fig. 3, the bottom board is seen at $B^3$. This board is constructed of several pieces but instead of being tongued, and grooved, the edges of the main bottom are laid together smooth leaving between them a space of about one half an inch and a strip of sheet iron or thin board is laid over the joint and nailed on one side to the main board the other side slipping over the joint, and resting on the other board loosely as seen in dotted lines Fig. 2. By this arrangement (notwithstanding any shrinkage or expansion,) the bottom is always kept close, without straining the sides of the machine.

In the operation of my invention, the grain is placed in the throat and passes through the machine as usual in such machines. The belt H, is of great use in sections of country where they save the heads of the grain with but little straw. I have found that in machines having bars made in boxes the fine straw with the grain and chaff fall into said cavities in the belt, and is carried over under the picker, on to the riddle, and thus encumbers the machine with straw. By my belt this is avoided, and the picker is made to revolve rapidly. The straw by it is thus carried over to the vibrating belt, when it is conveyed away. The cellular belt has no end pieces on the cross bars, but fits up close against the adjustable elastic sides, which thus prevents the grain or chaff from falling in between the belt and sides of the machine and it also affords an opportunity of putting the belt in less space, so that a grain pan can be placed farther under than on any ordinary machine.

The machine is put in motion in its different parts by means of belts and pulleys such as are common to other machines of like class.

Having described the construction and operation of my invention what I claim and desire to secure by Letters Patent is—

The cellular belt H, as arranged in combination with the vibrating belt I, with the projections or fingers $f$, teeth $g$, and pins $h$, and arms I' and stacker L, all operating as set forth and for the purposes described.

A. B. CRAWFORD.

Witnesses:
T. G. CLAYTON,
Jos C. CLAYTON.